United States Patent Office 3,066,024
Patented Nov. 27, 1962

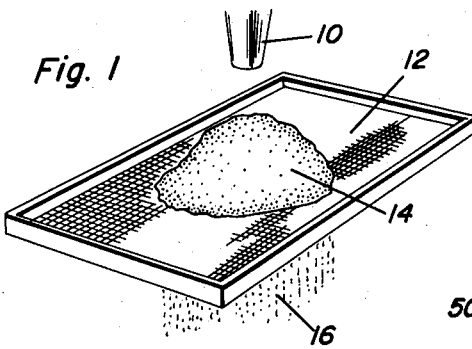
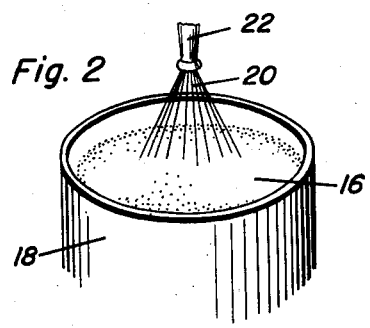
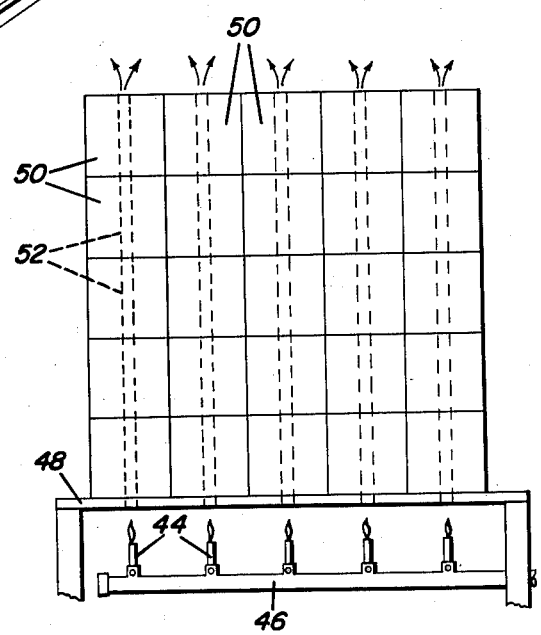
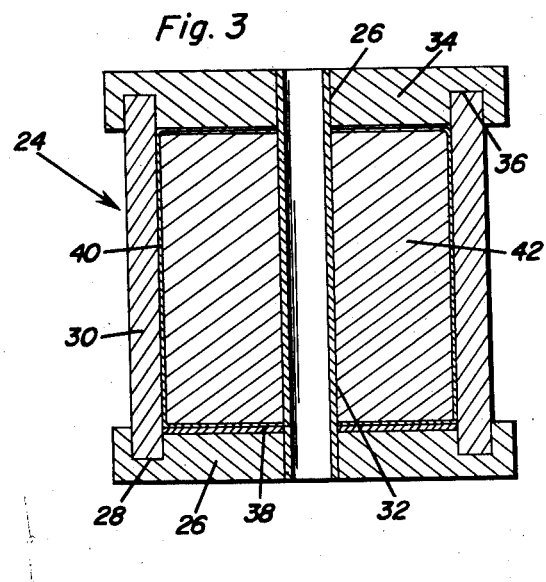
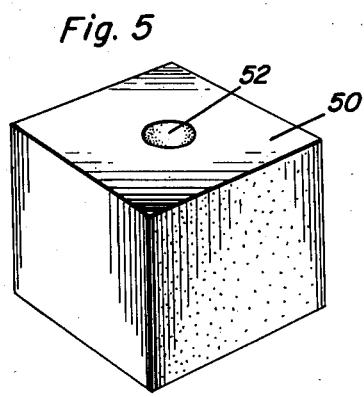
Lee S. Williams
INVENTOR.

3,066,024
PROCESS FOR MAKING STOCK SALT BLOCKS
Lee S. Williams, P.O. Box 172, Loving, N. Mex.
Filed June 3, 1959, Ser. No. 817,894
7 Claims. (Cl. 99—2)

This invention comprises a novel and useful process for making stock salt blocks and more particularly relates to an improved block of salt adapted for use by cattle, and other stock together with a method for forming the improved salt block.

Cattlemen and stock raisers are in the habit of providing large blocks of salt in the fields whereby the cattle or stock may lick the same to obtain the necessary salt in their diet. One conventional form of salt block is a cube of about 9½ inches on a side.

In certain locatilies where potash is plentiful, as for example in various mines and refineries near Carlsbad, New Mexico, a waste by-product of the potash refining process consists of salt containing small amounts of other minerals which are highly beneficial to cattle and stock. The chemical composition of the waste by-product from mines in the above mentioned region is approximately 96% sodium chloride, 3% potassium chloride, .5% calcium sulphate, .4% magnesium silicate and .1% iron oxide, the latter giving the product a distinctive pinkish color. This salt by-product is superior to ordinary stock block salt, which does not contain the additional minerals, which contains a lower percentage of sodium chloride, and which contains other minerals which are not beneficial to cattle.

It is therefore desirable to make use of this waste by-product of the refining of potash as a cattle or stock salt source.

The main disadvantage of the potash stock salt which has been heretofore employed is that it does not readily compress into dense, hard, strong, water resistant blocks. Blocks heretofore made therefrom have absorbed moisture readily, become soft and crumbled easily when exposed to the weather. As a result, it could not be readily stored in a damp climate, and could not be stacked or shipped conveniently in damp weather. The market for them was poor in wet climates because of the storage difficulty and because heavy rains tended to dissolve blocks in the pastures.

Heretofore, potash stock salt blocks have been formed by pressing moistened salt into blocks and applying heat from the outside of the blocks. This process drives the moisture to the interior of the block, where it forms a spongy or porous center in the block. Such blocks therefore are not hard and dense throughout. They are structurally weak and cannot be stacked to any height in damp weather. They absorb moisture readily, both from the atmosphere and from the ground, if it is wet, by capillary action. Rain tends to dissolve them. They are difficult to ship, handle and store because they are inherently fragile and subject to breaking, crumbling and dissolving.

It is therefore the primary purpose of this invention to provide a method by which the potash waste products above mentioned may be economically and advantageously formed into dense, strong, water-resistant stock salt blocks.

A further object of the invention is to provide a process which will enable satisfactory salt blocks to be formed from the potash waste by-products which will contain therein the above mentioned desirable minerals.

A primary object of the invention is to provide a method whereby salt blocks may be formed of superior strength and weathering characteristics by applying heat from the center of the block to drive the moisture from the center of the block outwardly, thereby resulting in expelling practically all of the moisture from the block and forming a hard, dense, strong, water resistant block, which is capable of being satisfactorily shipped, stacked and handled in wet weather, and which does not absorb moisture from the atmosphere nor from the ground with any facility because the capillary action of the parts within the block is practically destroyed due to the density of the block.

A further object of the invention is to provide a process whereby large quantities of a waste by-product produced in the refining of potash may be economically put to a profitable and beneficial use as a salt block for cattle or other stock.

A specific object of the invention is to provide a process of forming salt blocks of potash, salt by-products wherein the block is so constructed as to facilitate the heating of the same from the interior thereof either singly or when disposed in stacks in a kiln or the like.

A further object of the invention is to provide a salt block which shall be capable of being molded and heated while encased in a protective sheet of weather-resistant material.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view illustrating the step of screening the crushed potash salt as a prelude to forming the moistened salt for insertion into a mold for shaping the salt block;

FIGURE 2 is a perspective view showing a second step in the method whereby the crushed potash is then moistened by applying a brine solution thereto;

FIGURE 3 is a view showing in vertical section a molding apparatus in position for molding the salt block therein;

FIGURE 4 is a somewhat diagrammatic view showing the manner in which the molded salt blocks in accordance with this invention are heated in order to impart the desired final characteristics to the salt blocks; and FIGURE 5 is a perspective view showing a salt block constructed in accordance with this invention.

In carrying out the process of forming salt blocks in accordance with this invention, it is understood that the potash salt obtained as a by-product during the refining of potash from mines or refineries is suitably crushed, and has been delivered as by a discharge means 10 upon a screen 12, through which the crushed potash salt 14 passes as indicated at 16. This screen is preferably 28 mesh, having 28 openings per linear inch or 784 per square inch. After passage through this screen as indicated in FIGURE 1, the particles 16 are collected and deposited in a moistening vat 18, as shown in FIGURE 2. In this vat a saturated brine solution as suggested at 20 is discharged as by a nozzle 22, the brine being added until the screened potash salt 16 has a moisture content of from about 1½% to about 2% by weight.

Suitable means may be provided for stirring the salt in the brine solution to effect thorough moistening of the same.

After the brine moistened, crushed and screened salt has been prepared as above mentioned, it is then applied into suitable molds which form a salt block of the requisite shape. A satisfactory form of mold is shown in FIGURE 3, the mold being indicated generally by the numeral 24. The mold includes a base 26 whose top surface has grooves or channels 28 in which are received the lower ends of the side walls 30. A mold core in the form of a rod or pipe 32 is secured in the base 26 and preferably extends upwardly from about the central portion of the base. Obviously, in some instances, a plurality of such mold cores may be provided depending upon the number of passages or openings which it is desired to produce in the finished salt block.

The mold is completed by a top 34 likewise having channels 36 in the lower side thereof which receive the upper ends of the side walls 30. The top wall also has an opening or openings 36 therethrough for sliding engagement upon the upper end of the upstanding mold core 32.

Within the mold cavity, and resting upon the bottom wall 26 of the mold there is provided a sheet of asbestos 38 of the same size as the interior of the mold and likewise provided with an opening to receive the mold core 32 therethrough. The inside of the mold cavity is lined with a protective sheet such as heavy kraft paper, this lining being indicated by the numeral 40 and extending along each of the side walls, upon the bottom wall 26 and the asbestos sheet 38 thereon, and being of sufficient height to be folded in upon the body of moistened salt 42 with which the mold cavity is then filled. The body of moistened salt is tamped or otherwise packed in the mold in any suitable manner and under moderate pressure as for example by hand tamping. This operation serves to compress and densify the moistened salt, tending to destroy any capillaries which might be formed between the salt particles. Conveniently, the above mentioned excess heights of the kraft paper lining 40 may be folded in upon the mass of salt 42 either before or after this tamping operation, and the cover 34 then applied, whereupon the final stage of tamping or compressing of the salt may be effected.

Thereafter, the cover is removed, and the body of salt 42 still retained within its protective sheet 40 of kraft paper and still seated on the asbestos pallet 38 beneath the same is removed from the mold 24 as by being slid off of the mold core 32.

As now shown in FIGURE 4, the blocks of compressed salt, still encased in the kraft paper and seated on the asbestos sheet is placed in a kiln of any desired character, the same having a plurality of nozzles 44 from which gases of combustion are discharged, these nozzles being serviced by a suitable supply pipe 46. These nozzles are disposed beneath the supporting platform 48 upon which the salt blocks each designated by the numeral 50, see also FIGURE 5, are stacked in any suitable relation. It will be observed in the stacking the central aperture or openings 52 through the block left by the mold core 32 are disposed in alignment as shown in FIGURE 4 to provide when the blocks are in juxtaposition continuous passages through the stack of blocks when piled upon the platform 48. It will be observed that the stacks of aligned blocks are so disposed that the aligned passages 52 will be each disposed over one of the burners 44 from which the products of combustion pass upwardly through corresponding openings in the platform 48 and through the continuous passages to be discharged at the top thereof as shown by the arrows in FIGURE 4.

In this manner, the heating medium is applied directly to the center of each block and heats the block from the center outwardly, thereby expelling or driving the moisture before it from the center of the block to the outer surfaces thereof. In this manner the prior art difficulty of leaving a block with a relative wet or spongy center, effected by heating the blocks from the exterior thereof, is completely overcome so that the block is of uniform dryness throughout, and thus attains its maximum strength.

The heat which is applied only to the interior of the blocks through the holes in the center thereof maintains a temperature of about 400° F. at the top of the holes of a stack of blocks which are five blocks high. This heat is applied until the outside surface of the block reaches a temperature of about 340° F. inside the paper wrappings.

After the heating operation is completed, and all moisture has been driven from the blocks, the blocks are removed from the kiln and are stored. They require no curing and are ready for immediate shipment, storage and use. The kraft paper is left on the blocks until they are placed in the pasture for the cattle. This paper is made of wood pulp and will not injure cattle, even if they should eat it. However, the paper is easily removed if desired.

Potash stock salt blocks when formed as above described are dense, strong and water resistant. They can be successfully shipped, stacked and handled in wet weather without danger of crumbling. The paper wrapping prevents them from sticking together and renders them clean to handle. They can be dropped on concrete without breaking. They are superior to present commercial white salt blocks because they contain a high percentage of minerals which are beneficial to cattle and they are easier for cattle to consume because they are not as hard and dense as present commercial white salt blocks. Cattle prefer potash salt blocks formed as above described to present commercial salt blocks and when the two are placed side-by-side, they will eat all the potash salt blocks before eating the white salt blocks. The present commercial white salt blocks are formed by a great pressure, containing a high percentage of gypsum which is not beneficial to cattle, and must be cured after they are formed.

What is claimed as new is as follows:

1. A process for making a weather resistant potash salt block for use by stock comprising the steps of forming a hollow block from moist potash salt with an opening extending entirely therethrough, compressing the formed block to a sufficient density to impart to it sufficient strength and rigidity to withstand handling, enclosing the block in a protective sheet having therein openings registering with the opening in the block, heating the block while in said protective sheet by passing a heating medium through said openings in said block and sheet and entirely through said block, continuing the step of heating and thereby drying the block by driving moisture from the interior of the block outwardly from said openings.

2. The process of claim 1 wherein the step of heating is effected by disposing a plurality of compressed blocks with their openings in communication with each other and passing said heating medium in succession through all of said communicating openings.

3. A process for making a weather resistant potash salt block for use by stock comprising the steps of forming a hollow block from moist potash salt with an opening extending entirely therethrough, enclosing the block in a protective sheet having therein openings registering with the opening in the block, compressing the formed block while in said protective sheet to a sufficient density to impart to it sufficient strength and rigidity to withstand handling, heating the block while in said protective sheet by passing a heating medium through said openings in said block and sheet and entirely through said block, continuing the step of heating and thereby drying the block by driving moisture from the interior of the block outwardly from said opening in said block.

4. The process of claim 3 wherein the step of heating is effected by disposing a plurality of compressed blocks with their openings in communication with each other and passing said heating medium in succession through all of said communicating openings.

5. A process for producing a weather resistant salt block for use by stock comprising forming in a completely enclosing protective sheet a block of moist potash salt with an opening extending entirely through said block and sheet, compressing the formed block while in said sheet to a density sufficient to impart to the block strength and rigidity to withstand handling, heating and drying the compressed block while in said sheet by passing a heating agent through said opening in said sheet and block to a sufficient degree of dryness to afford sufficient strength and moisture resistance to withstand handling without damage to the block.

6. The process of claim 5 wherein the step of heating is effected by disposing a plurality of compressed blocks with their openings in communication with each other and passing and heating medium in succession through all of said communicating openings.

7. The process of claim 5 including continuing the heating step until the block has been substantially dried and the moisture therein has been driven radially through said block and outwardly from said opening.

References Cited in the file of this patent

UNITED STATES PATENTS

| | | |
|---|---|---|
| 422,370 | Brott | Mar. 4, 1890 |
| 2,142,825 | Patten | Jan. 3, 1939 |